April 9, 1968 P. J. H. JANSSEN 3,377,501

LINE DEFLECTION CIRCUIT FOR USE IN TELEVISION RECEIVERS WITH A FREQUENCY DEPENDENT NETWORK CONNECTING THE FEEDBACK CONTROL CIRCUIT WITH THE CONTROL ELECTRODE OF THE OUTPUT AMPLIFIER

Filed July 24, 1964

INVENTOR.
PETER J.H. JANSSEN
BY Frank R. Trifari
AGENT

United States Patent Office 3,377,501
Patented Apr. 9, 1968

3,377,501

LINE DEFLECTION CIRCUIT FOR USE IN TELEVISION RECEIVERS WITH A FREQUENCY-DEPENDENT NETWORK CONNECTING THE FEEDBACK CONTROL CIRCUIT WITH THE CONTROL ELECTRODE OF THE OUTPUT AMPLIFIER

Peter Johannes Hubertus Janssen, Emmasingel, Eindhoven, Netherlands, assignor to North American Philips Company, Inc., New York, N.Y., a corporation of Delaware Filed July 24, 1964, Ser. No. 385,008
Claims priority, application Netherlands, Aug. 12, 1963, 296,560
6 Claims. (Cl. 315—27)

ABSTRACT OF THE DISCLOSURE

A television line deflection circuit includes a control circuit having a non-linear resistor for developing a direct current control voltage. The control circuit is connected to the output transformer of the line deflection circuit. A frequency-dependent coupling network interconnects the control circuit with the control electrode of the output amplifier so as to attenuate the high-frequency components of the control voltage supplied thereto.

Figures 1, 2, 3:
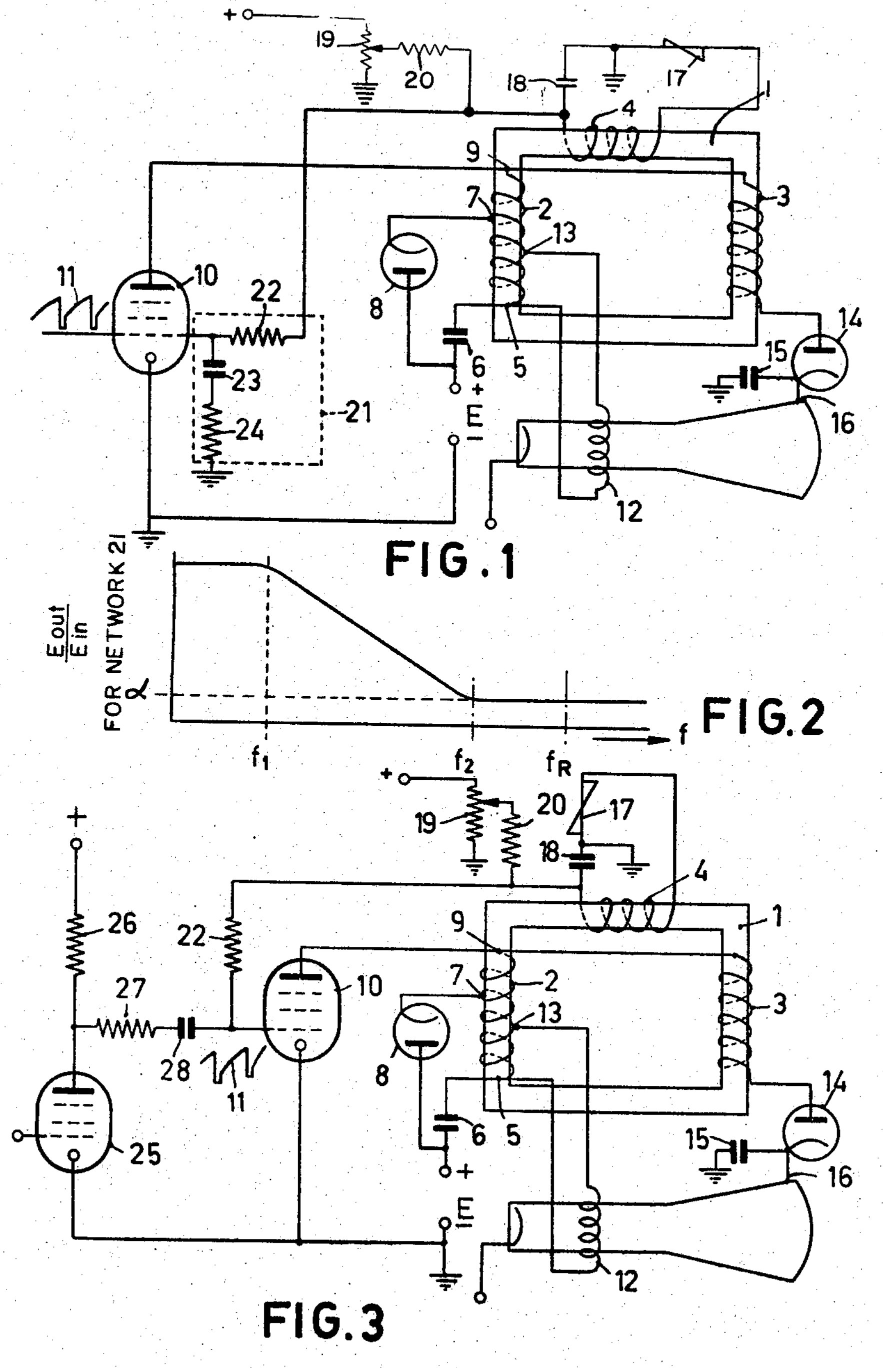

The invention relates to a line deflection circuit for use in a television receiver, more particularly to a line deflection circuit including control means for stabilizing the reproduced picture. The deflection circuit includes a periodically cut-off amplifying element and a transformer having a booster circuit connected in the output circuit of the amplifying element. The line deflection coils are connected to the transformer. A rectifier is included for producing the high voltage for the final anode of the display tube, and at least one voltage derived from the transformer is applied to a non-linear element for producing a control voltage to be applied to a control electrode of the amplifying element.

In general, the control circuit provided in the aforesaid arrangement is intended to keep the dimensions of the scene reproduced by the display tube as constant as possible. The transformer has connected to it, via said rectifier, the final anode of the display tube, which constitutes an additional (high voltage) load for the line deflection circuit. Since the beam current in the display tube varies with the brightness of the scene to be reproduced, the display tube is a variable load for the line deflection circuit without any control, the high voltage of the final anode of the display tube decreases with an increasing beam current, and at the same time, an approximately corresponding decrease of the sawtooth current passing through the line deflection coils occurs. Both the variation of the high voltage and the variation of the sawtooth current produce a variation in the line deflection and hence in the width of the picture.

Due to the leakage inductance of the transformer, it is not possible to obtain sufficient control such that both the high voltage and the sawtooth current remain constant. In order to obtain nevertheless a constant width of the picture it has been proposed to proportion the control circuit so that a relative variation in the high voltage is attended with one half as large a relative variation in the sawtooth current through the line deflection coils. From the theory of the deflection sensitivity of a display tube it follows that with this proportioning the influence of the high voltage variation on the line deflection is compensated by an equal but opposite influence of the sawtooth current variation on said line deflection.

Although with this proportioning the width of the picture is kept constant, it is not possible to keep also the height of the picture constant in a similar manner, since due to the high time constants of the field sawtooth current generator the field deflection current is not capable of following the variations of the high voltage, so that the influence of the variable high voltage on the field deflection cannot be compensated by a suitable variation of the field deflection current.

It has been found that a quieter picture for the spectator can be obtained when the field deflection current is kept constant and the variation in the height of the picture is attended with an identical variation in the width of the picture. For this purpose, in accordance with the type of display tube employed, the line deflection current should vary little or not at all with the high voltage. Measurements have shown that, when using a display tube of 110° deflection, having an image ratio of 5:4, a relative high voltage variation should be attended with a seven times smaller relative line-deflection current variation.

When the control-circuit is proportioned in this way, it is found that nevertheless a wedge-shaped variation in the width of the picture occurs, since a variation of the high voltage within one field period causes the line deflection to vary within one field period so that, for example, the reproduced image is broader on the bottom side than on the top side.

An object of the invention is to avoid said disadvantage. The line deflection circuit according to the invention is characterised in that the control voltage is applied to the control electrode through a network having a frequency-dependent transmission ratio. For frequencies equal to and higher than the field frequency, the transmission ratio is smaller than it is for direct voltage so that a variation in the high voltage within one field period results in a constant line deflection and variations of the high voltage over a plurality of field periods result in a line deflection which increases with a decreasing high voltage.

The invention will be described more fully with references to the figures of the drawing, in which:

FIG. 1 shows a first embodiment of a circuit arrangement according to the invention.

FIG. 2 serves for a further explanation of the invention and

FIG. 3 shows a second embodiment of a circuit arrangement according to the invention.

Referring to FIG. 1, reference numeral 1 designates a transformer consisting of a closed circuit of ferromagnetic material, on which there are provided a primary winding 2, a secondary winding 3 and a tertiary winding 4. The primary winding is connected at one end 5 through a booster capacitor 6 to the positive terminal of a supply voltage source E. Also, a tapping 7 of the primary winding is connected through an efficiency diode 8 to the same positive terminal. The end 9 of the primary winding is connected to the anode of a pentode 10, the cathode of which is connected to earth (the negative terminal of the supply voltage source) and to the control grid of which is applied a signal 11, which periodically cuts off the pentode. The connections of the further electrodes of the pentode are not indicated since they may be made in any known manner.

One or more horizontal deflection coils 12, which are provided on the display tube, in which they produce the line deflection of the electron beam, are connected between the end 5 of the primary winding of the transformer and a tapping 13 on said winding. For the whole duration of the forward stroke the pentode 10 is made conductive by the control signal 11 to an extent such that the diode 8 will conduct. Between the connections 5 and 7 of the transformer there is operative the series booster voltage of the capacitor 6 during the forward stroke time. This voltage is operative, subsequent to transformation, across the whole primary winding and, also transformed across the deflection coils 12. This voltage produces in the deflection coils a sawtooth current.

During the fly-back time the pentode 10 is cut off by the control signal 11, so that the diode 8 is also cut off. The energy stored in the transformer and in the deflection coils produces an electric oscillation across the stray capacities of the arrangement, so that a high positive voltage pulse is provided across the primary winding. This positive voltage pulse is stepped up in the secondary winding 3 and rectified by means of a rectifier 14. The positive direct voltage thus obtained is smoothed by a capacitor 15 and applied to the final anode 16 of the display tube.

The line deflection circuit of FIG. 1 comprises furthermore a control circuit including the tertiary winding 4 of the transformer and the series combination of a voltage-dependent resistor 17 and a capacitor 18. The voltage of the tertiary winding is applied to said series combination. The junction of the voltage-dependent resistor 17 and the capacitor 18 is connected to earth and the direct voltage obtained across the capacitor 18 by the rectifying effect of the nonlinear element 17 is applied to the control electrode of the pentode 10. With the aid of a potentiometer 19, connected to a positive voltage, and by means of a resistor 20, an adjustable direct current is produced which passes via the tertiary winding 4 through the voltage-dependent resistor 17. It is known that this measure provides a marked increase in control sensitivity. In addition, by adjusting this direct current the values of the voltages in the transformer, and hence the width of the picture reproduced by the display tube, can be adjusted.

In accordance with the invention the control voltage is applied to the control electrode of the pentode via a frequency-dependent network 21. This frequency-dependent network includes a resistor 22 one end of which is connected to the control circuit and the other end of which is connected to the control electrode of the pentode 10. The end of the resistor 22 that is connected to the control electrode is connected to earth via the series combination of a capacitor 23 and a resistor 24.

As stated in the preamble a variation in beam current in the display tube causes both the high voltage of the final anode 16 and the sawtooth current through the line deflection coils 12 to vary. These variations are for the major part compensated by the control circuit, but complete compensation of both variations is not possible. The degree of compensation of the high-voltage variations and of the sawtooth current variations depends upon the position of the tertiary winding 4 relative to the primary winding 2 and the secondary winding 3. When the position of the tertiary winding 4 is chosen so that the relative variation of the sawtooth current $i$ amounts to half the relative variation of the high voltage V ($di/i=+\frac{1}{2}dV/V$), the horizontal deflection of the beam current in the display tube remains constant owing to the deflection sensitivity of the display tube. In order to ensure, however, that the picture height and the picture width of the reproduced scene vary relatively to the same extent, the position of the tertiary winding 4 in the embodiment of FIG. 1 is chosen so that the sawtooth current $i$ remains substantially constant. When using a display tube in which the width of the picture is equal to the height thereof, the sawtooth current $i$ must be kept accurately constant ($di/i=0$). However, if as is usually done, a display tube is employed which has a substantially flat picture screen and a width to height ratio of 5:4, the horizontal sawtooth current $i$ must vary slightly with the high voltage V, in accordance with the relation; $di/i=\frac{1}{7}dV/V$. Such a proportioning of the control circuit, in which the horizontal deflection varies with the high voltage has, however, the disadvantage that the horizontal deflection also varies during a field period, which becomes manifest particularly in a wedge-shaped deformation of the width of the picture. During the field-fly-back period the beam current is suppressed and the high voltage rises, so that during the first part of the field scan the horizontal deflection is small. During the remainder of the field scan the high voltage drops so that the horizontal deflection is increased. In order to avoid this disadvantage, the frequency-dependent network 21 is provided in the embodiment of FIG. 1, in accordance with the invention, between the control circuit and the control electrode of the pentode 10. For slow variations of the control voltage produced by the control circuit (for example, variations smaller than 3 c./s.) the impedance of the capacitor 23 is very high. Slow variations of the control voltage produced across the capacitor 18 are therefore applied completely to the control grid of the pentode 10 and the tertiary winding 4 is positioned so that slow variations of the high voltage produce equal relative variations in the height and the width of the picture of the reproduced scene. However, for rapid variations of the control voltage, and particularly for variations having a frequency equal to or higher than the field frequency (50 c./s.), the capacitor 23 constitutes substantially a short circuit. The components of the control signal of a frequency equal to or higher than the field frequency are therefore attenuated by the potentiometer $R_{22}$–$R_{13}$ before they are applied to the control grid of the pentode 10, so that for these frequencies the control is considerably less effective than for the slow variations. By a correct choice of the resistance values of the resistors $R_{22}$ and $R_{24}$, the attenuation of the high frequencies is adjusted so that for these frequencies a relative variation of the high voltage is attended with one half as large a relative variation of the sawtooth current ($di/i=\frac{1}{2}dV/V$). By this measure it is ensured that the horizontal deflection within one field period remains constant. However, for slow variations of the high voltage during a plurality of field periods, for example, in the event of scene changes, the height and the width of the picture vary to an equal extent, the width of the picture remains constant within one field period, and the aforesaid wedge-shaped deformation of the width of the picture is avoided.

For further explanation, FIG. 2 illustrates the transmission ratio (the voltage applied to the control grid of the pentode divided by the voltage produced by the control circuit) of the frequency-dependent network 21. This network has two characteristic frequencies $f_1$ and $f_2$. The upper characteristic frequency $f_2$ of this network is equal to the characteristic frequency of the circuit $C_{23}$–$R_{24}$ ($f_2=1/(2\pi R_{24}C_{23})$ and in accordance with the invention it is chosen to be lower than the field frequency $f_R$. The attenuation $\alpha$ for the frequencies exceeding $f_2$ is equal to $R_{24}/(R_{24}+R'_{22})$, wherein $R'_{22}$ is equal to $R_{22}$ plus the internal resistance of the control-circuit. The lower characteristic frequency $f_1$ is equal to $\alpha f_2$.

FIG. 3 shows a second embodiment of a line deflection circuit according to the invention. In this figure the circuit elements corresponding to the circuit elements of the embodiment of FIG. 1 are designated by the same reference numerals.

In this embodiment the parts required for obtaining the frequency-dependence control also are employed for coupling the signal 11 to the control grid of the pentode 10.

Subsequent to amplification in an amplifying tube 25, having an anode resistor 26, this signal is applied to the control grid of the pentode 10 through a resistor 27 and a coupling capacitor 28. The coupling capacitor 28 serves to prevent the direct anode voltage of the tube 25 from attaining the control grid of the pentode 10. For the control voltage applied through the resistor 22 to the control grid of the pentode 10, the coupling capacitor 28 has the same function as the capacitor 23 of the embodiment of FIG. 1. The two resistors $R_{26}$ and $R_{27}$, connected in series for the control signal, have the same function as the resistor $R_{24}$ of FIG. 1.

An arrangement of FIG. 3 in a practical embodiment has the following values:

| | | |
|---|---|---|
| $R_{26}$ | ohms | 33K |
| $R_{27}$ | do | 47K |
| $C_{28}$ | $\mu$f | 0.1 |
| $R_{22}$ | ohms | 20K |
| $R'_{22}$ ($R_{22}$ plus the internal resistance of the control circuit) | do | 450K |

With these values $$f_2=1/(2\pi C_{28}(R_{26}+R_{27}))=20\text{ c./s.}$$
$$f_1=1/(2\pi C_{28}(R'_{22}+R_{26}+R_{27}))=3\text{ c./s.}$$
$$\alpha=(R_{26}+R_{27})/(R'_{22}+R_{26}+R_{27})=1/6.6$$

In the line deflection circuit employed for this value of $\alpha$ (1/6.6), the correct control was obtained, in which case the horizontal deflection is independent of high voltage variations occurring at the field frequency.

What is claimed is:

1. A line deflection circuit for producing a sawtooth current in the horizontal deflection coil of a television system comprising, amplifier means having a control electrode and an output electrode, a transformer having winding means coupled to said output electrode, a booster circuit coupled to said winding means, means for applying an electric signal to said control electrode for periodically cutting off the flow of current in said amplifier means thereby to produce a sawtooth current in said transformer winding means, a rectifier coupled to a portion of said winding means so as to produce a high direct voltage for the acceleration anode of the television display tube, means for coupling said deflection coil to said winding means, a control circuit coupled to another portion of said winding means and including a non-linear rectifying element for developing a direct current control voltage, a frequency-dependent coupling network interconnecting said control circuit with said control electrode, said network having a frequency-dependent transmission ratio that decreases as the frequency of the applied voltage increases so that for frequencies equal to or higher than the deflection field frequency the transmission ratio is smaller than it is for direct voltages, whereby a variation of the high voltage load occurring within one field period produces a substantially constant line deflection and a variation of the high voltage load occurring over a plurality of field periods produces a line deflection that increases for a decreasing value of the high voltage.

2. A deflection circuit as described in claim 1 wherein said coupling network comprises a resistor and a capacitor connected in series between said control electrode and a point of constant voltage, the series combination of said resistor and capacitor having a characteristic frequency that is lower than the field frequency of the system.

3. A deflection circuit as described in claim 1 wherein said coupling network comprises a first resistor connected between said control circuit and said control electrode, a second resistor and a capacitor connected in series between said control electrode and a point of reference voltage, the values of said first and second resistors and said capacitor being chosen so that frequency components of the control voltage that are equal to or higher than the field frequency are attenuated to a greater extent than are the low frequency components in the approximate range of 3 cycles per second.

4. A deflection circuit as described in claim 1 wherein said transformer includes a magnetic core and said winding means comprises, a primary winding on said core connected to said output electrode, said booster circuit and said deflection coil, a secondary winding on another part of said core and connected to said rectifier, a tertiary winding on still another part of said core and magnetically coupled to said primary and secondary windings, and means connecting said tertiary winding to said control circuit.

5. A deflection circuit as described in claim 1 wherein said signal applying means includes a driver amplifier having an output electrode at which said electric signal is developed, a first resistor connected between said driver output electrode and a source of supply voltage, a second coupling network interconnecting said driver output electrode to said control electrode of the amplifier means, said second coupling network including a capacitor, the second coupling network and the output impedance of said driver amplifier together forming a series RC circuit having a characteristic frequency that is lower than the field deflection frequency of the system.

6. A deflection circuit as described in claim 5 wherein said second coupling network consists of a coupling capacitor and a second resistor connected in series therewith.

References Cited

UNITED STATES PATENTS

| | | | |
|---|---|---|---|
| 2,621,309 | 12/1952 | Faudell | 315—27 |
| 3,061,757 | 10/1962 | Janssen et al. | 315—27 |

ROBERT L. GRIFFIN, *Primary Examiner.*

DAVID G. REDINBAUGH, *Examiner.*

R. K. ECKERT, *Assistant Examiner.*